Patented June 9, 1925.

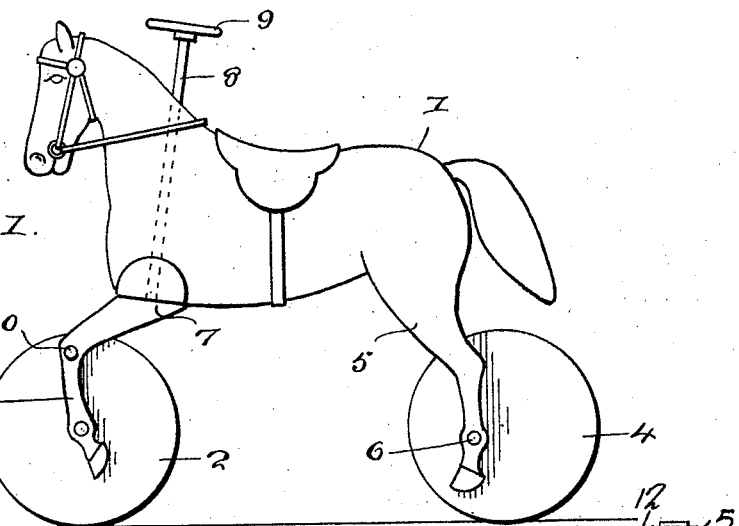
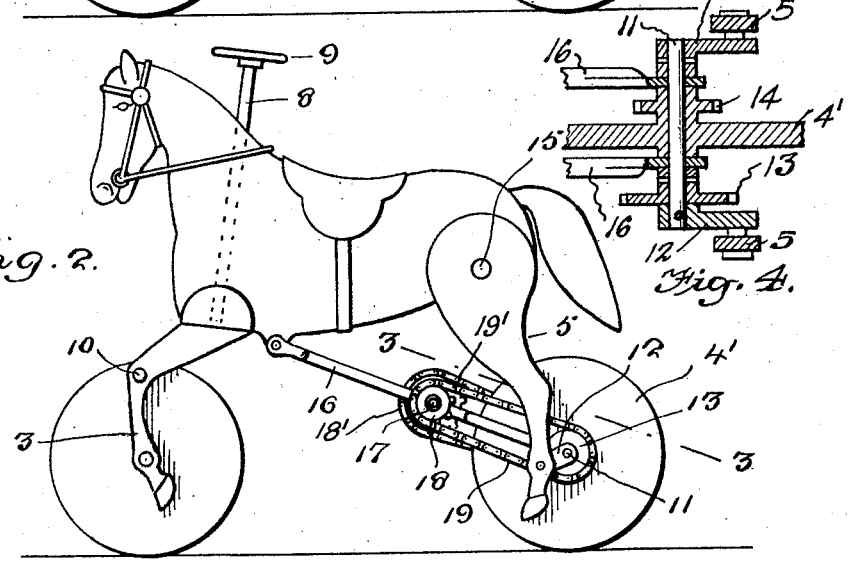
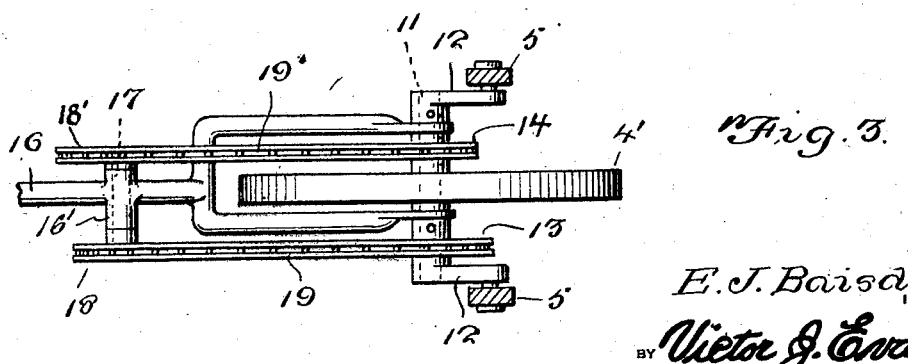

1,541,097

UNITED STATES PATENT OFFICE.

EDWARD J. BAISDEN, OF NEW YORK, N. Y., ASSIGNOR, BY MESNE ASSIGNMENTS, OF ONE-HALF TO GEORGE E. GREY AND ONE-HALF TO GERRIT J. LLOYD, BOTH OF NEW YORK, N. Y.

CHILD'S VEHICLE.

Application filed December 2, 1922. Serial No. 604,555.

*To all whom it may concern:*

Be it known that I, EDWARD J. BAISDEN, a citizen of the United States, residing at New York, in the county of New York and State of New York, have invented new and useful Improvements in Children's Vehicles, of which the following is a specification.

The principal object of this invention is to mount a body, preferably made in the form of a horse, upon wheels in such a manner that an up and down movement of the rider will propel the device, the movement of the rider being similar to that of a horse-back rider.

Another object of the invention is to provide means for transmitting the movement of the body to the drive wheel so that the speed can be increased or decreased as desired.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of one form of the invention.

Figure 2 is a similar view of a second form.

Figure 3 is a section on line 3—3 of Figure 2.

Figure 4 is a section on line 4—4 of Figure 3.

In these views 1 indicates the body which is preferably made in the form of a horse and upon which the rider sits as if on a real horse. The front wheel 2 is pivoted between the front legs 3 of the horse and the rear wheel 4 is pivoted between the rear legs 5. The pivot pin 6 for the rear wheel is eccentrically arranged in the wheel so that the rear part of the horse is caused to move up and down as it travels along. This arrangement of the rear wheel will also cause the device to be propelled when the rider rocks himself to and fro in simulation of a real horse-back rider as this rocking movement will cause the wheel to rotate to bring that part of its periphery farthest from the pivot point in contact with the ground and then the wheel will roll along under the action of gravity until its low part is in engagement with the ground. Thus the device can be propelled at considerable speed by the rider. The front legs are pivotally connected with the body as shown at 7, so that the device can be steered by the steering rod 8 to which the handle 9 is attached. Pins 10 are carried by the front legs and form a rest for the feet of the rider.

In Figures 2, 3 and 4 a shaft 11 has the wheel 4' rotatably mounted thereon and cranks 12 are fastened to the end of the shaft. These cranks are pivotally connected with the rear legs 5 of the body which are pivoted to the body, as shown at 15. A sprocket wheel 13 is fastened to one of the cranks and a sprocket 14 is fastened to the hub of the wheel 4'. A forked rod 16 has its front end pivoted to the under part of the body and its other end is forked and has eyes therein through which the shaft 11 passes. This rod carries a bearing 16' for a shaft 17 which has its ends projecting beyond the ends of the bearing and sprockets 18 and 18' are secured to said ends. A chain 19 passes over the sprocket 13 and the sprockets 18 and a second chain 19' passes over the other sprocket 18' and the sprocket 14 on the hub of the wheel 4'. It will thus be seen that the wheel 4' and the sprocket 14 are rotatably mounted on the shaft 11 and this shaft has secured thereto the cranks 12 and the sprocket 13. It will also be seen that the rocking movement of the horse will cause the crank assembly to rotate and this movement of the crank assembly is communicated to the shaft 17 through sprocket 13, chain 19 and sprocket 18 and the resultant rotation of the shaft 17 is communicated to the wheel 4' through the second sprocket 18', the chain 19' and the sprocket 14. Thus by placing the proper size sprockets on the device the desired speed can be given the device from its rocking movement.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a body made in the shape of an animal having four legs, a front wheel pivoted between the front legs, means for pivotally connecting the rear legs with the body, a crank shaft having its cranked ends pivoted to the rear legs, a wheel rotatably mounted on the crank shaft, a link connecting the crank shaft with an under part of the body and gearing connecting the crank shaft with the wheel.

2. A device of the class described comprising a body, front and rear wheels for supporting the same, the rear wheel being carried by a depending part of the body, a crank shaft connected with the depending part and upon which the rear wheel is rotatably mounted, a link connecting the shaft with the under part of the body, sprockets on the shaft and wheel, a shaft carried by the link and sprockets on said shaft and chains connecting the sprockets of the last mentioned shaft with those on the wheel and crank shaft.

In testimony whereof I affix my signature.

EDWARD J. BAISDEN.